(12) United States Patent
Knauseder

(10) Patent No.: US 7,021,019 B2
(45) Date of Patent: Apr. 4, 2006

(54) PANELS WITH CONNECTING CLIP

(75) Inventor: Franz Knauseder, Wals (AT)

(73) Assignee: Kaindl Flooring GmbH, Salzburg (AT)

( * ) Notice: Subject to any disclaimer, the term of this patent is extended or adjusted under 35 U.S.C. 154(b) by 81 days.

(21) Appl. No.: 10/663,633

(22) Filed: Sep. 16, 2003

(65) Prior Publication Data
US 2004/0060255 A1 Apr. 1, 2004

(30) Foreign Application Priority Data
Sep. 18, 2002 (DE) .................. 102 43 196

(51) Int. Cl.
*E04F 13/08* (2006.01)
(52) U.S. Cl. .............. 52/588.1; 52/582.1; 52/582.2; 52/391; 24/297
(58) Field of Classification Search ......... 52/588.1, 52/582.1, 585.1, 582.2, 391; 411/508, 488; 24/297, 453, 581.11; 403/329
See application file for complete search history.

(56) References Cited

U.S. PATENT DOCUMENTS

| 1,723,306 | A | * | 8/1929 | Sipe ..................... 52/396.04 |
| 4,426,820 | A | | 1/1984 | Terbrack et al. |
| 4,571,910 | A | * | 2/1986 | Cosentino ................ 52/391 |
| 4,599,841 | A | * | 7/1986 | Haid .................. 52/396.04 |
| 5,866,057 | A | * | 2/1999 | Roffael ................. 264/113 |
| 6,536,178 | B1 | * | 3/2003 | Pålsson et al. .......... 52/392 |
| 6,729,091 | B1 | * | 5/2004 | Martensson ............. 52/391 |
| 6,763,643 | B1 | * | 7/2004 | Mårtensson ............ 52/586.1 |

FOREIGN PATENT DOCUMENTS

| DE | 6927558 U | 7/1969 |
| DE | 2 251 762 | 10/1972 |
| DE | 297 03 123 U1 | 2/1997 |
| DE | 196 54 320 A1 | 7/1997 |
| WO | WO 93/13280 | 7/1993 |
| WO | WO 00/20705 | 4/2000 |

* cited by examiner

Primary Examiner—Basil Katcheves
(74) Attorney, Agent, or Firm—Pearne & Gordon LLP

(57) ABSTRACT

A panel includes coupling elements arranged so that two panels an be connected to one another by a form-fit connection at the same time in a first direction perpendicular to the common joint and in a second direction parallel and perpendicular to the common surface of the panels. The panels may be used to provide a laminate flooring. The form-fit connection achieves greater security during assembly with reference to any enlargement of cracks and inaccuracies when laying parquet flooring. Laid parquet flooring elements no longer slip relative to one another even when subjected to relatively large stresses, thereby avoiding damage and the need for follow-on work. The coupling element is preferably designed as a separate synthetic material clip in the shape of the letter H.

32 Claims, 3 Drawing Sheets

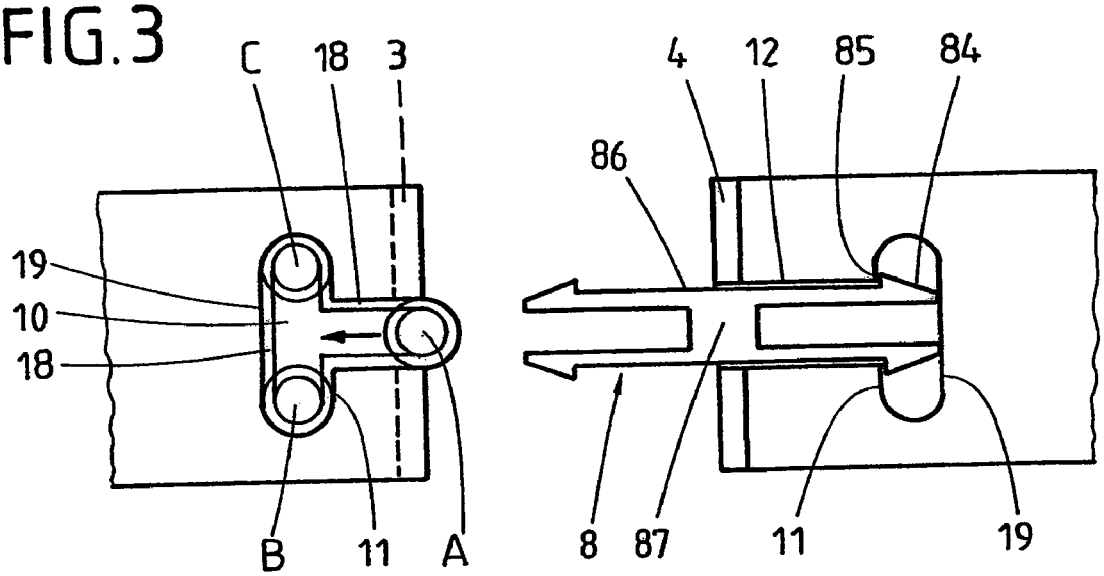
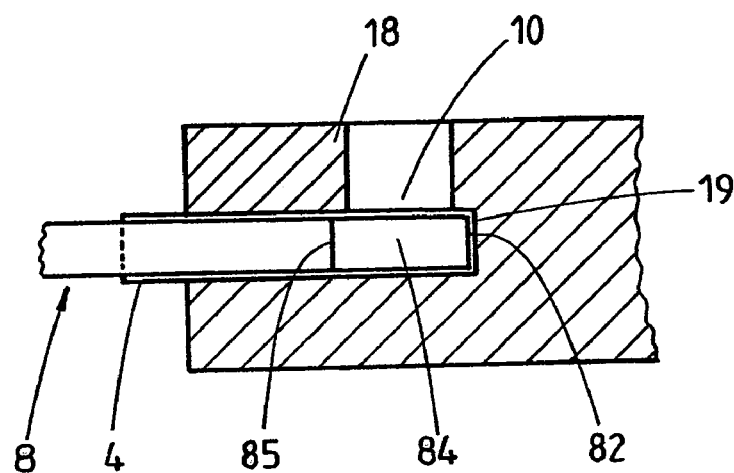
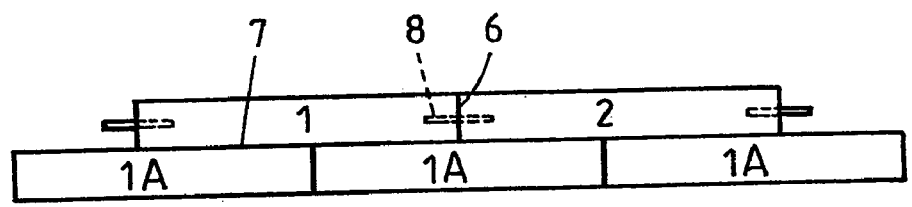

PANELS WITH CONNECTING CLIP

The invention relates to a panel with coupling elements, which are designed in such a manner that two panels can be connected to one another by form-fit connection in a first direction perpendicular to the common joint and at the same time in a second direction parallel and perpendicular to the common surface of the panels. The use of glue is not required if the panels according to the invention are used as a floor or wall covering.

A panel of the type named above is known, for example, from document WO 00/20705. At their edges, these panels provide grooves for retaining a separate, symmetrically designed tongue element, the panels being locked together by form-fit connection both perpendicular to the common surface of the panels and also perpendicular to the joint. Locking is achieved by snap-fastening, so that either the tongue or the groove must provide elastic resilience in the direction perpendicular to the surface of the panels. Regarding the dimensions of snap-fastening connections of this kind, it is therefore essential to provide a certain space perpendicular to the surface, which satisfies the mechanical and geometrical requirements for a snap-fastening. Moreover, panels connected to one another in this manner can be unintentionally displaced along the common edge of the joint, which can lead to unintentional inaccuracies in laying. Accordingly and also as a result of unintentional displacement, any cracks formed at the joint are also enlarged. Dirt may collect in these cracks, or water may penetrate at this position, thereby causing the core of the panel to swell. The crack therefore becomes raised in the region of the surface and is subjected to increased stresses, thereby reducing the operating life of the panel as a whole.

Panels with a force-fit or form-fit tongue and groove connection are also known. To prevent displacement of the panels along the common joint, it is possible, for example, to select a particularly large degree of compression; this increases the stress on the material in the region of the tongue and groove, thereby subjecting the surface of the panel in this region to increased wear. Furthermore, if the tongue and groove are made from the same material as the panel, for example, by milling into the core, the entire panel must be made from a material which provides the properties of strength and resilience required for a secure connection. However, for the flooring itself, a more cost-favourable material would be sufficient.

With the panels known according to the prior art, the intention is to ensure that once the panels have been connected to one another, especially by non-glued connection, they cannot be accidentally detached from one another in the laid condition, even with the application of a relatively large force.

The material for panels of the type named above may be selected freely. However, panels which consist entirely or predominantly of a wooden material are especially relevant according to the invention. A parquet floor panel may consist, for example, entirely of wood. Alternatively, a parquet floor panel may comprise a carrier board, which consists, for example, of HDF and/or MDF. One or more parquet strips are attached above the carrier board. A layer or a paper may be applied below the carrier board to provide a counteracting force to prevent deformation. Panels which can be interconnected without the use of glue and which consist entirely or predominantly of a synthetic material, are also known, for example, from document U.S. Pat. No. 4,426,820.

Furthermore, the invention relates to a laminate flooring, which comprises a carrier board made from a wooden material. MDF and HDF are currently preferred as the wooden material. Another typical wooden material consists of glued wood chips. A decorative layer, which comprises a decorative paper alongside a protective layer, is applied above the carrier board. As described above, a counteracting paper is applied beneath the carrier board to prevent deformation. Technical laminates and panels made from these materials are becoming increasingly relevant in this context. They are used particularly as floor coverings.

Panels of the type according to the invention may comprise one or more of the features named above. The object of the invention is therefore to provide panels of the above type, which avoid the named disadvantages. In particular, increased security with reference to the accidental release of individual panel elements and an increased operating life of the panel can be achieved during laying and in the laid condition of the parquet flooring.

The object of the invention is achieved with a panel which provides the features of claim 1. Advantageous embodiments are defined in the dependent claims.

The panel of the above type according to the invention provides a coupling element, which is designed in such a manner that two panels can be connected to one another, especially by form-fit connection, along the common joint formed by the panels. This is understood to mean that the panels are secured or fixed to prevent unintentional displacement or separation in the direction along the common joint. Known panels can conventionally be displaced along the common joint and/or any such displacement is only hindered by the connection which is intended to prevent movement perpendicular to the common joint or in the direction parallel and perpendicular to the common surface of the panels. With the prior art, this restriction of movement is merely an accompanying effect of a connection acting in another direction. The form-fit connection along the common joint according to the invention therefore achieves increased security during assembly with reference to any enlargement of cracks and inaccuracies during the laying of the parquet flooring. Once laid, the parquet elements cannot slip relative to one another even when subjected to relatively large stresses. This prevents damage and renders follow-on work unnecessary.

From the perspective of recycling, it is preferable if the coupling elements and the panels are made from a wooden material, which can also be implemented in one piece.

If a coupling element, especially the coupling element which connects the panels along the common joint, is provided as a separate coupling element made from a different material from the panels, all the properties of the connection can be controlled independently of the panel. For example, by selecting the material and the geometry of the separate coupling element, its resilience and strength can be adjusted independently of the panel to achieve an optimum connection. Synthetic materials are particularly appropriate, because they can be readily processed and finished in a variety of ways at low cost.

The horizontal and/or vertical contact surfaces at the edges of the panels on which the coupling elements are provided, lock the panels with reference to any displacement in a vertical and/or horizontal direction. In this context, tongue and groove connections without undercutting are preferred; that is to say, connections which do not represent snap-fastening connections and which therefore allow the connection to be made without the resilient deformation of their elements. Such connections are already sufficiently well-known within the field of panel technology. Furthermore, tongue and groove connections are also preferred, in which a tapering of the tongue and/or the groove assists insertion and, using a press-fit connection, increases accuracy.

By preference, the coupling element which achieves the connection along the common joint is held by form-fit connection in a recess in the panel. In this context, the form-fit connection can act both in the direction along the common joint and also perpendicular to the common joint. As a result, the panels are not only pressed together; any displacement along the joint is also prevented so that the coupling element fulfils a double function. This coupling element will be referred to below as a secondary or separate coupling element.

Furthermore, it is preferred if the secondary coupling element is inserted into the recess in the panel in the manner of a snap-fastening. A snap-fastening connection is understood, in particular, to be a connection wherein the coupling element is introduced into an aperture while its outer, hook-shaped limits are pressed together and then engage with undercutting in the recess, thereby achieving a connection. The undercutting in the recess is designed in such a manner that after a coupling element has been introduced, the coupling element cannot be withdrawn from the recess without being pressed together again by some other means. In this context, it is preferable if a further wall is provided in the recess, which limits any movement of the coupling element in the opposite direction after it has been inserted. Ideally, the coupling element is completely fixed in the direction perpendicular to the common joint, after it has been inserted.

In a further advantageous embodiment, the surfaces of the secondary connecting element which engage behind the undercutting in the recess are chamfered and/or the undercutting itself is chamfered in such a manner that a partially inserted connecting element is drawn deeper into the recess by the restoring forces of the compressed arms. Ideally, the element is drawn so far into the recess, that its end-face presses against a rear wall extending opposite to the undercutting. As a result, the coupling element can no longer be moved; this renders any deflecting movement of the coupling element impossible. The chamfer has the further advantage that the panels, recesses and coupling elements do not need to be manufactured with such accuracy. Any play between the building elements is compensated by drawing the elements into the recess, and the snap-fastening is ensured even with relatively inaccurate components.

It is advantageous if the secondary coupling element cannot be compressed in the region of the common contact surface of the panels when it is inserted into the recess. This prevents any movement of the panels along the common joint, because in this region, the secondary coupling element is rigid.

The secondary coupling element is particularly easy to manufacture if it provides two arms extending essentially parallel to one another, of which the free ends can be moved in a resilient manner relative to one another from a normal position to a compressed condition as it is engaged with other coupling elements, and thereafter, allowed to return to its normal position upon full engagement. The space between the arms can therefore be used as clearance for the movement. The resilience can also be influenced by the length and thickness of the arms. It is particularly preferable if the secondary coupling element is designed in the form of a letter "H", because in this manner, both arms can be realized in a double format, i.e. acting in opposite directions.

A symmetrical format also facilitates manufacture and assembly, because nothing can be confused. The horizontal web of the "H" in this context, at the same time, forms a point of attachment for the arms and the necessary rigid portion of the secondary coupling element which cannot be pressed together.

Assembly of the coupling elements and/or the fitting of one side of the coupling elements to the panels in the factory can be simplified if the free ends of the arms are tapered to assist insertion into the recess in the panels. The tapering allows the arms to be centred and compressed until the snap-fastening connection has been achieved. Compression of the arms therefore requires no additional effort.

In a further embodiment, the secondary coupling element can be inserted into the recess exclusively in one direction parallel to the surface of panels. This prevents the secondary coupling element from occupying a position between and under-floor and the panel, as described in document WO 93/13280. These connecting clips allow a space between the panel and the under-floor which causes undesirable resonant noise.

In a further embodiment, the recess is designed in such a manner that it can be manufactured to include the undercutting by milling with a 3-axis stepped milling head. With a stepped milling head, starting from the joint, it is possible to mill a recess which holds the secondary coupling element by the upper and lower sides and also by the side walls at the same time. Production can therefore take place in a cost-effective manner in a single operation. Milling is carried out initially from the joint, parallel to the surface of the panel. Following this, the milling head is moved backwards and forwards at right angles to this direction, but still parallel to the surface, thereby forming a T-shaped recess parallel to the underside of the panel. At the top, this recess is limited on both sides by webs left in place by the upper part of the stepped milling head because of its relatively small diameter; this provides an additional vertical holding for the secondary connecting element. After this, the milling head is moved perpendicular to the underside of panel and directed away from the latter. At this stage, the upper webs are, at the same time, partially removed by the lower part of the stepped-milling head. This completes the milling process. These movements form the undercutting for the surface of the secondary coupling element, the rear wall, the upper webs and the lower surface of the recess.

Furthermore, the invention is preferably used with known panels made from wood or wooden materials. These particularly well tried and tested and economically-manufactured materials comprise, for example, HDF or MDF with a decorative paper or a decoration on the upper surface, or comprise a carrier board, which consists of several papers compressed together especially with amino resin. The invention is therefore particularly suitable for coverings and floor coverings, which are made from panels according to the invention.

A thickness of 6 to 15 mm, a length from 100 to 2000 mm and a width from 100 to 2000 mm represent dimensions which can be readily handled by the fitter or user. The secondary, separate connecting element advantageously provides the dimensions conventional for generic panels, especially dimensions which are conventional for floor coverings of this kind. In this context, a person skilled in the art can select the essential parameters, such as, the length of the arm, the compressibility of the arms, the thickness of the element and the material, in such a manner that the function described can be achieved. The same applies for the design of the tongue and groove connections.

The invention can be used with all known types of panel connections.

The invention will be described below with reference to the drawings.

FIG. 3 shows a plan view of the panels from FIG. 2;

FIG. 4 shows a cross-section of the recess in a panel with connecting elements inserted and FIG. 5 shows an outline sketch of panels connected to one another.

Figure 1:
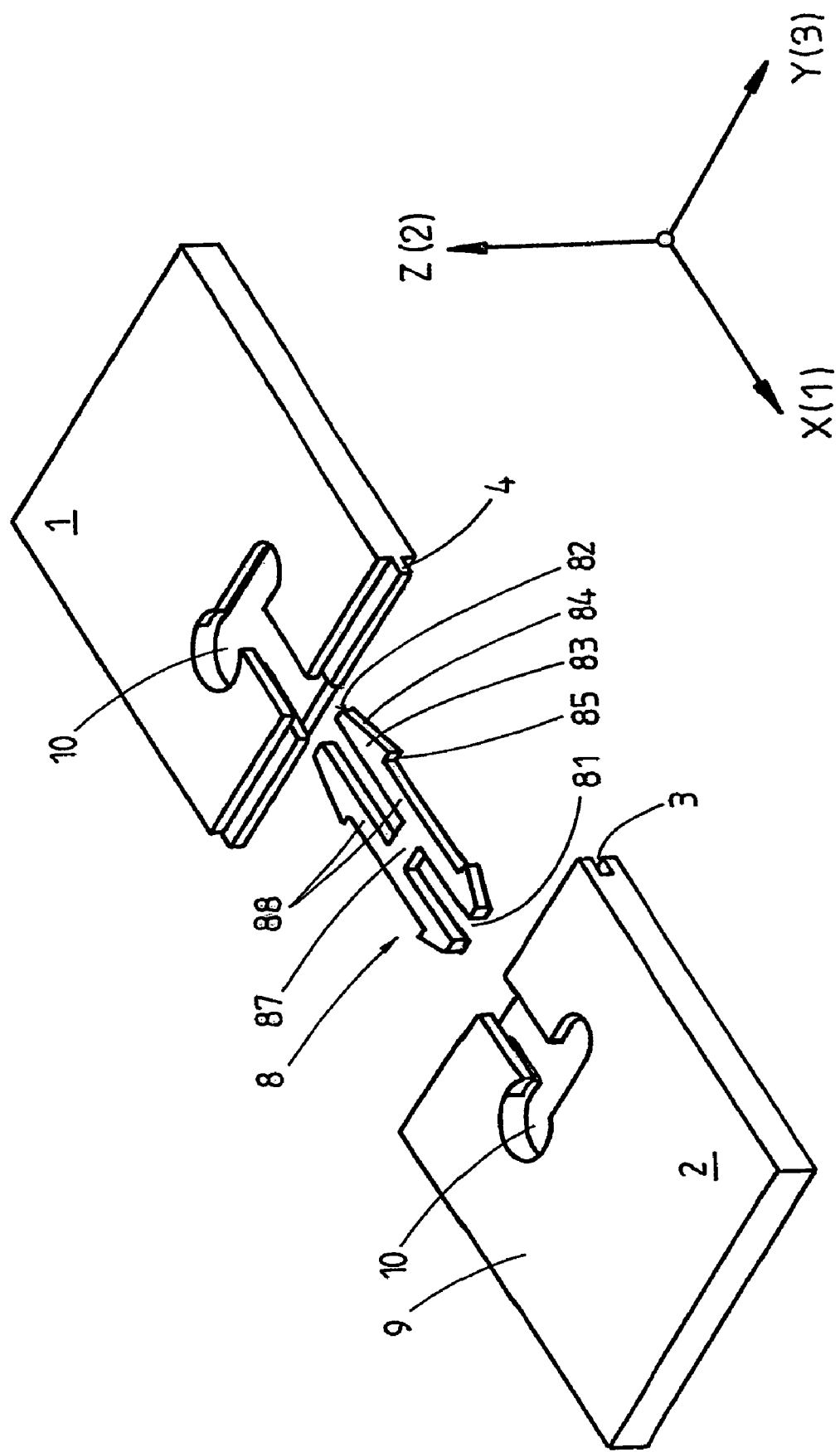
FIG. 1 shows a perspective view of panels with connecting elements not fitted.

FIG. 1 shows two panels 1, 2, which are to be connected to one another by means of the coupling elements 3, 4, 8. In this context, the connection along the joint 5 is explained in greater detail by way of example. The other edges of the panels can be designed in any manner desired. In the example, the tongue and groove connection 3, 4 and the connecting clip 8 represent the coupling elements. Without the assistance of any further coupling elements, the tongue and groove connection including horizontal contact surfaces 41 (FIG. 2) would only fix the two panels 1, 2 in the direction of the Z-axis, that is, perpendicular to the surface of the panels. Movement or separation of the panels would, however, still be possible in the Y-direction and in the X-direction. Locking in the two directions named above is made possible according to the invention by a coupling element in the form of a connecting clip 8—which is separate in this example. Starting from a central web 87, two arms 88 running parallel to one another in each case, extend in opposite directions; these arms are provided with hooks 83 in the region of the front end 81 and/or the rear end 82.

The hooks serve to fix the connecting clips 8 in the interior of the recess 10 provided in the panels, that is to say, to prevent them from being pulled out in the direction of the X-axis. The drawing in FIG. 1 therefore illustrates the connection of panels in which the connecting clip, acting as the secondary coupling element, is initially not attached to either of the panels. As a result, the dimensions of the panels are reduced; this reduces the packaging size, because the clip 8 does not project over the lateral wall. This also means that the relatively delicate connecting clip cannot be damaged during transport and handling.

Figure 2:
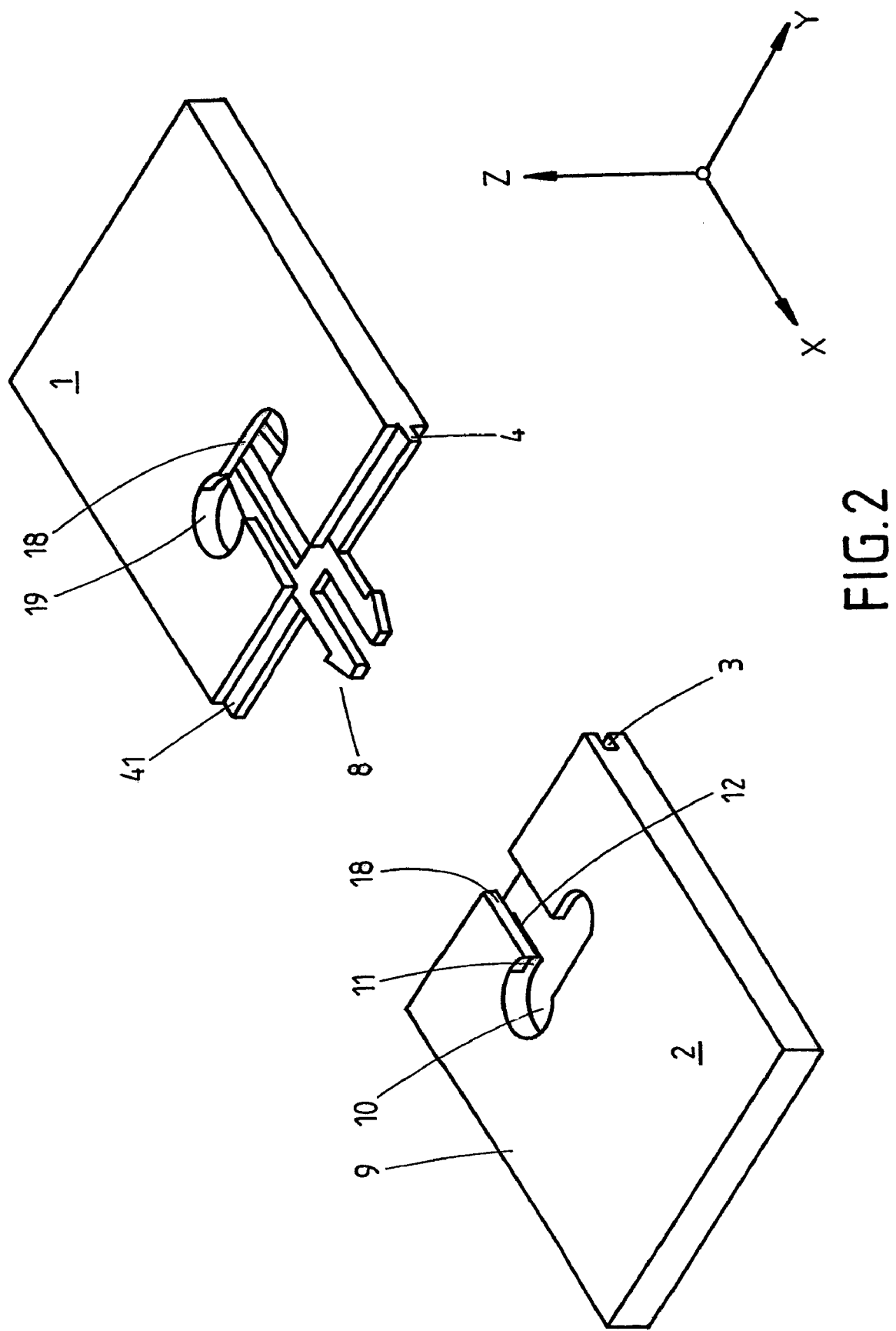
FIG. 2 shows a perspective view of panels with a connecting element fitted but not connected to one another.

FIG. 2 shows the panels from FIG. 1, in which the connecting clip has already been fitted. This can be implemented in the factory. In this case—by way of deviation from the diagram—it is not absolutely necessary for the connecting clip to provide hooks for snap-fastening on both sides. It may be connected firmly to the panel 2 in any other manner, for example, by press-fit or glued connection. It may indeed also be milled into one of the panels. The clips are advantageously attached by means of a fitting machine, the underside of clips being, optionally, appropriately formed.

FIG. 3 illustrates the attachment of the clip 8 in the recess 10 of the panels. As in FIG. 1 and FIG. 2, the diagram shows the underside 9 of the panels. The recesses are preferably milled into the underside, because this will not impair the visible surface. The letters A, B and C ion the left-hand panel illustrate the appropriate manufacture of a recess 10 according to the invention. Starting from the position A, a stepped milling head (indicated by two co-axial circles) penetrates the end-face of the panel. As a result of the contour of the stepped milling head, a web 18 remains in the region of the surface of the underside 9 of the panel, which prevents the inserted clip from falling out in the direction of the Z-axis.

In a further operational stage, the milling head is moved in the direction of the Y-axis (downwards in FIG. 3), that is at 90° to its former direction of travel. At this stage, it forms the first undercutting 11, which is used for attachment of the surface 85 of the clip. Also at this stage, a web 18 remains, which limits the top of the recess 10. In a further stage, the stepped-milling head is moved, without altering its height, in the opposite direction towards position C. This forms the second undercutting 11. The last two movements also form the rear wall 19 which is opposite to the undercutting 11. In a final stage, the milling head is moved outwards from the plane of the page in the direction of the Z-axis, thereby milling out the part of the web 18 above the stepped-milling head. The geometry of the recess 10 can therefore be produced in a single operational stage with a stepped-milling head. In this context, it is also advantageous that, as a result of moving the milling head into positions B and C, an access is created for fingers or similar, which therefore allows the arms 88 of the clip to be compressed to release the connection. To ensure an optimum connection of the panels without bending moments, the clip 8 is held in the recess 10 in the plane of the tongue 4, as shown in FIG. 3 in conjunction with FIG. 4. The clip used touches the end wall 19, remote from the end-face of the recess, with its rear end-face 82; this allows steadying when fitting together the two panels. The tapering 84 allows resilient compression of the tips of the arms when the clip 8 is introduced into the recess 10. First vertical contact surfaces or locking surfaces comprising hook-shaped surfaces 85 at the rear ends of the arms engage surfaces of the undercutting 11 in the recess and therefore lock the clip to prevent withdrawal from the recess. The web 87, which bears the four arms, is again arranged in such a manner that the clip 8 cannot be compressed in this region. This ensures that the panels cannot be displaced relative to one another in the Y-direction, because the clip cannot yield in this region and engagement of second vertical contact surfaces 86 and 12.

FIG. 4 illustrates that the clip 8 is inserted in the plane of the tongue. This represents a preferred embodiment. However, different geometries are also conceivable. The relevant factor is that the clip 8 used exerts a force in such a manner that no crack occurs, especially in the region of the visible, walking surface, between the panels held together by the clip.

Finally, FIG. 5 shows an arrangement of the panels according to the invention with longitudinal sides 7 and narrow sides 6. The longitudinal sides are all those edges which are longer than the narrow sides. Known flooring panels typically provide longitudinal sides of approximately 1.60 m and narrow sides of approximately 25 cm. It is preferable to connect the shorter, narrow sides 6 in the manner according to the invention. The longitudinal sides 7 can be connected in any manner required. The longitudinal sides of the panels 1A and 1 may, for example, be connected with a snap-fastening tongue and groove connection, the two sides being connected to one another by displacement within the same plane. After this, panel 1A and 2 are connected to one another in the same manner, so that the narrow sides 6 of panels 1 and 2 do not touch but provide a gap, which allows the clip 8 according to the invention (only suggested in FIG. 5) to be handled. After panels 1 and 2 have been connected to panel 1A, panels 1 and/or 2 can be moved towards one another along the longitudinal edge of panel 1A until the connection according to the invention has been implemented. In this context, chamfered surfaces 85 on the clips 8 are expedient, because they allow a play-free connection by drawing the two panels 1 and 2 towards one another, with an appropriately designed restoring force and angle of inclination of the surface 85 and the opposing surface 11. It is also conceivable that panels 1 and 2 are initially connected to one another according to the invention and are then jointly connected together in a manner already known from the prior art by horizontal displacement towards the already laid panel 1A. It is also known from the prior art that panels can be connected to one another along their longitudinal sides by rotary movement around the longitudinal edge rather than by a horizontal movement towards one another. Longitudinal connections of this kind are also included within the scope of the invention.

The invention claimed is:

1. Panels having surfaces for extending along a common surface plane and coupling elements comprising a first coupling element and a secondary coupling element arranged to connect first and second panels at a common joint with a form-fit connection that simultaneously secures the panels together to prevent unintentional separation in a first direction perpendicular to the common joint, a second direction perpendicular to the common surface plane and a third direction extending along the common joint, said first and second panels being connected in said second direction by said first coupling element and in said first and third directions by said secondary coupling element, said secondary coupling element including relatively movable portions compressible only in said third direction to connect and disconnect said first and second panels in said first and third directions.

2. Panels according to claim 1, wherein said secondary coupling element has a flat configuration.

3. Panels according to claim 1, wherein said first and second panels are formed entirely or predominately of wood and/or a wooden material.

4. Panels according to claim 1, wherein said secondary coupling element is separable from the panels and said first coupling element includes horizontal contact surfaces that secure said first and second panels in said second direction.

5. Panels according to claim 4, wherein said horizontal contact surfaces are provided by a tongue and groove connection, said tongue has a tongue thickness extending in said second direction and a recess for receiving said secondary coupling element, and said secondary coupling element has a flat configuration in said first and third directions and a coupling thickness in said second direction substantially equal to said tongue thickness, said secondary coupling element extending in said recess between said first and second panels.

6. Panels according to claim 5, wherein said secondary coupling element is inserted into said recess with said relatively movable portions compressed together and cannot be withdrawn from said recess unless the relatively movable portions are compressed together.

7. Panels according to claim 6, wherein said recess includes an undercutting having undercut locking surfaces, said secondary coupling element includes secondary locking surfaces arranged to lock with said undercut locking surfaces when said secondary coupling element is inserted into said recess so that said secondary coupling element is locked in said first direction and prevented from being withdrawn from said recess.

8. Panels according to claim 7, wherein said undercut locking surfaces and said secondary locking surfaces are chamfered to cause said secondary coupling element to be drawn into said recess.

9. Panels according to claim 7, wherein said recess includes a recess wall opposed from said undercutting and extending in said second direction, said recess wall limiting further movement of said secondary coupling element in said first direction after said locking surfaces are locked.

10. Panels according to claim 4, wherein said secondary coupling element is held in a recess in said horizontal contact surfaces.

11. Panels according to claim 10, wherein said secondary coupling element is held in said recess in a press-fit connection.

12. Panels according to claim 10, wherein said secondary coupling element is held in said recess in a form-fit connection.

13. Panels according to claim 10, wherein said secondary coupling element has a horizontally extending flat configuration, size substantially corresponding with that of said recess in said horizontal contact surfaces, and said secondary coupling element extends in said recess only in a plane that is parallel to said common surface plane of said panels.

14. Panels according to claim 13, wherein said secondary coupling element has an H-shape.

15. Panels according to claim 10, wherein said secondary coupling element has a horizontally flat configuration and includes two substantially parallel extending arms terminating at free ends that can be moved in a resilient manner relative to one another.

16. Panels according to claim 15, wherein said secondary coupling element and said recess are constructed so that said secondary coupling element may be introduced into said recess in only one direction parallel to said common surface plane of said panels.

17. Panels according to claim 16, wherein said secondary coupling element includes locking surfaces at said free ends of said arms for engaging said undercutting.

18. Panels according to claim 17, wherein said free ends of said arms include a taper, and said free ends are temporarily pressed against their own restoring force in order to introduce said secondary coupling element into said recess.

19. Panels according to claim 18, wherein said recess is shaped so that it can be formed by milling with a stepped-milling head moved in said first, second and third directions to provide an opening in the lower side of said first and second panels, said free ends of said arms being accessible through said opening for pressing together to disconnect said first and second panels.

20. Panels according to claim 1, wherein said coupling elements include first vertical contact surfaces that secure said first and second panels in said first direction.

21. Panels according to claim 20, wherein said coupling elements include second vertical contact surfaces that secure said first and second panels in said third direction.

22. Panels according to claim 1, wherein said secondary coupling element is a separate coupling element having a horizontally flat configuration in said first and third directions, and said first and second coupling elements have substantially equal thicknesses extending in said second direction.

23. Panels according to claim 1, wherein said secondary coupling element is a separate coupling element and said relatively movable portions have a normal position and said secondary coupling element is formed of a material having a larger restoring force for returning said relatively movable portions to said normal position than the restoring force resulting if the secondary coupling element was formed of the material forming the panels.

24. Panels according to claim 23, wherein said secondary coupling element relatively movable portions may be compressed in said third direction against said restoring force.

25. Panels according to claim 1, wherein said first and second panels include opposed longitudinal sides to provide a common connecting joint and opposed narrow sides, said coupling elements are provided on one or both of said narrow sides, and said panels are constructed on said longitudinal sides so that said panels may be connected by a rotary movement about the common connecting joint.

26. Panels according to claim 1, wherein said first and second panels include opposed longitudinal sides and opposed narrow sides, said coupling elements are provided on one or both of said narrow sides, and said panels are constructed on said longitudinal sides so that said panels may be connected at the longitudinal sides by a horizontal movement towards one another.

27. Panels according to claim 1, wherein said first and second panels include opposed longitudinal sides and opposed narrow sides, said coupling elements are provided on one or both of said narrow sides, and said panels are constructed on said longitudinal sides so that said panels may be connected by displacement in one plane and/or by vertically lowering said first panel relative to said second panel.

28. Panels according to claim 1, wherein said panels have a rectangular or square configuration, a thickness in the range of from about 6 mm to about 15 mm and an edge dimension in the range of from about 100 mm to about 2000 mm.

29. A floor covering comprising panels according to claim 1.

30. Panels having surfaces for extending along a common surface plane and coupling elements comprising a first coupling element and a secondary coupling element arranged to connect first and second panels at a common joint with a form-fit connection that simultaneously secures the panels together to prevent unintentional separation in a first direction perpendicular to the common joint, a second direction perpendicular to the common surface plane and a third direction extending along the common joint, said first and second panels being connected in said second direction by said first coupling element and in said first and third directions by said secondary coupling element, said secondary coupling element including relatively movable portions compressible in said third direction to connect and disconnect said first and second panels in said first and third directions, said secondary coupling element having a flat configuration in said first and third directions.

31. Panels according to claim 30, wherein said first and second coupling elements each have width and length dimensions extending in said first and third directions and each have substantially equal thickness dimensions extending in said second direction, and said thickness dimensions are less than said width and length dimensions.

32. Panels having surfaces for extending along a common surface plane and coupling elements comprising a first coupling element and a secondary coupling element arranged to connect first and second panels at a common joint with a form-fit connection that simultaneously secures the panels together to prevent unintentional separation in a first direction perpendicular to the common joint, a second direction perpendicular to the common surface plane and a third direction extending along the common joint, said first and second panels being connected in said second direction by said first coupling element and in said first and third directions by said secondary coupling element, said secondary coupling element including relatively movable portions compressible in said third direction to connect and disconnect said first and second panels in said first and third directions, said first and secondary coupling elements having substantially equal thicknesses extending in said second direction.

* * * * *